Figure 1:
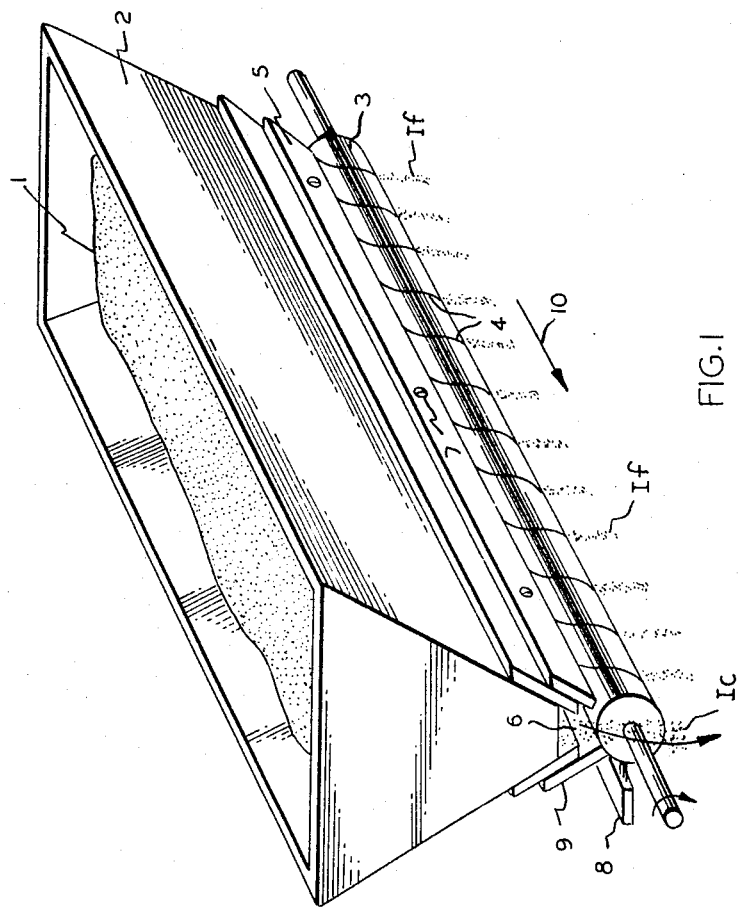

Oct. 25, 1966    J. K. CARTWRIGHT ETAL    3,280,973
APPARATUS FOR DISTRIBUTING AND SCREENING
PARTICULATE MATERIAL
Filed Dec. 30, 1963      2 Sheets-Sheet 1

INVENTORS
JOHN K. CARTWRIGHT
WILLIAM R. HUTCHISON

BY *Milton L. Simmons*

ATTORNEY

INVENTORS
JOHN K. CARTWRIGHT
WILLIAM R. HUTCHISON

BY *Wilton L. Simmons*

ATTORNEY

United States Patent Office 3,280,973
Patented Oct. 25, 1966

3,280,973
APPARATUS FOR DISTRIBUTING AND SCREENING PARTICULATE MATERIAL
John K. Cartwright and William R. Hutchison, Nashville, Tenn., assignors to Ferro Corporation, Cleveland, Ohio
Filed Dec. 30, 1963, Ser. No. 334,287
6 Claims. (Cl. 209—233)

This invention deals generally with an apparatus for selectively passing certain fines of particulate material therethrough, within a defined area, and rejecting coarser particles, associated with said fines, outside the area wherein said fines are distributed; more particularly, this invention deals with an auger-type apparatus having a helical groove in the surface of its rotating member, which auger permits passage of fine particulate material through said apparatus, and rejects coarse material.

Heretofore, auger-type mechanisms have been utilized to a great extent for feeding particulate material from a supply source to a desired delivery point, frequently operating within a fully enclosed housing. These mechanisms are typified by the disclosures of United States Patents 128,267, 519,786, 858,508, 1,260,219, 2,504,787, 2,613,633 and 2,643,032. Furthermore, auger-type feed mechanisms have frequently been used to distribute particulate material by feeding same through a perforate housing whereby the material being carried by the auger is forced through openings in the bottom of the structure to thus feed particulate material to a predetermined area.

The apparatus used heretofore however has had the disadvantage of being slow, and requiring frequent cleaning and maintenance by virtue of the particulate material, being under considerable pressure, caking and jamming the auger.

It is therefore an object of this invention to provide an apparatus for selectively distributing particulate material of a certain particle size from a charge of particulate material of varying particle sizes, and rejecting coarse material above a predetermined particle size.

It is also an object of this invention to provide an auger-type feed mechanism for distributing particulate material over a predetermined area.

Briefly and simply stated then, our apparatus consists of a hopper designed to permit particulate material charged thereinto to gravitate to the lowest point of said hopper, a feed roller having cut therein a helical groove to form a type of auger, said roller situated at the lowest point in said hopper and communicating with the interior thereof, said apparatus capable of receiving a charge of particulate material, some particles of which are smaller than the width or depth of said groove permitting same to fall therein and thereby pass from said hopper as said feed roller is rotated. Material in the charge which is too coarse to fall into the groove is worked along the length of the hopper as the feed roll rotates, and is ultimately passed out the end of said hopper into a container for subsequent regrinding and reintroduction into said hopper.

The novel apparatus we have devised is applicable to any number of operations requiring even distribution of fine particulate material from a mixture of coarse and fine material. The specific application of the embodiment of our apparatus as hereinafter described in more detail, is in the field of fiber glass, particularly the manufacture of felted, fiber glass mat for plastic reinforcing purposes. After the chopped fibers have been cascaded uniformly onto a foraminous conveyor to form the mat, it is frequently desirable to introduce evenly over the fibers a bonding material, for subsequent curing, consisting of a thermosetting powdered resin binder.

The powdered resin obtained from suppliers, is, for the most part, well within the particle size range desired for normal application, but there are always a few isolated agglomerates which are too large for the intended purpose. At the same time, there aren't enough of the large lumps in the powdered binder to warrant a full scale milling or pre-screening operation. Therefore, it is expeditious to simply dump the powdered material consisting of discrete particles of resin binder into our apparatus, which distributes the desired fines evenly, from one edge of the foraminous conveyor with the glass fiber superimposed thereon, to the other, and selectively rejecting any coarse particles to a point outside the limits of the fiber glass mat. When enough of the rejected coarse particles have been collected, they may be ground to the desired particle size and reintroduced into the apparatus for subsequent deposition.

Figure 2:
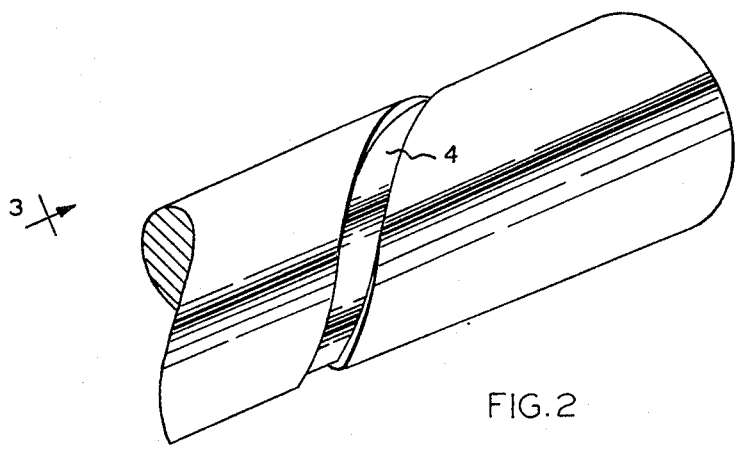
Figure 3:
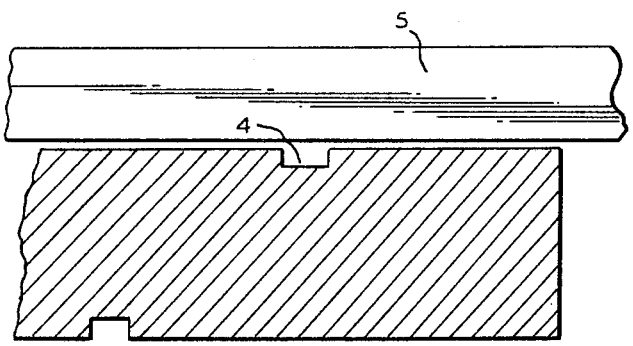

In the following drawings:
FIG. 1 is a perspective view of an embodiment of our invention;
FIG. 2 is an enlarged view of a section of the feed roll;
FIG. 3 is a cross-section through the section 3—3 of FIG. 2.

Referring now specifically to FIG. 1 wherein is shown an embodiment of our apparatus in operation, the charge of mixed coarse and fine particulate material designated as 1 is placed into hopper 2 which has a cross-section in the form of an inverted triangle with its truncated apex at the bottom. Feed roller 3 is rotated in the direction shown by any conventional means not shown, and it will be seen, particularly with reference to FIGS. 2 and 3, that feed roller 3 has cut in its surface a helical groove 4 having a rectangular cross-section of a given depth and width.

As will be apparent from FIG. 1, the feed roller 3 is in direct communication with the interior of hopper 2 and any particulate material in hopper 2 having a maximum diameter less than the width of the groove 4 will gravitate thereinto and, as feed roll 3 rotates, will be carried past the retaining edge 5, if the maximum diameter of said particle is also less than the depth of said groove. The fine particle will then drop downwardly by the force of gravity as indicated. The material shown dropping from below the feed roll is designated as if to indicate fine particulate material.

Concurrently with the above operation, any coarse material having a maximum diameter greater than the width (or depth) of the groove, will not be permitted to pass through the rectangular opening formed by the three edges of the groove in the feed roll 3, and the straight edge of the retaining edge 5, and will be worked along by the feed roll within the hopper until it reaches opening 6 in the end of hopper 2, at which point the coarse material spills out the edge of the hopper as indicated by reference numeral 1c.

Thus, a fiber glass mat, as yet uncured, passing generally at right angles to the axis of rotation of feed roll 3, beneath the apparatus as shown in FIG. 1, will receive a steady stream of fine bonding resin on its surface which will become intermingled with the fibers, and when said fiber glass mat is passed through a heat curing operation, said binder will be cured, or partially cured, to lend preliminary strength to the mat for handling and shipping. At the same time, the coarse material will cascade out the end of the apparatus as shown, outside the limits of the foraminous conveyor and mat, and may be caught by any suitable container, not shown, adjacent the foraminous conveyor carrying the fiber glass mat.

Suitable means 7 consisting either of a slot and screw, or eccentric collar arrangement, may be utilized to slide retaining edge 5 into snug relationship with feed roll 3 to a point of zero tolerance, or slightly greater; in either case, member 5 being maintained a distance from feed roll 3 sufficient to prevent the unhindered flow of fine material from the hopper other than via the groove 4.

A brush 8 may be utilized to good advantage, fixed to the side of the hopper by any suitable means in such a manner that its bristles constantly penetrates the grooves of feed roll 3 along its length, so that as the feed roll rotates, any particulate material remaining in the groove will be brushed out and dropped onto the fiber glass mat below. This helps insure even and uniform distribution of the particulate material to the mat below. A back seal 9, similar to retaining edge 5, is provided on the other side of the hopper to minimize leakage of material from the point where feed roll is in contact with the opposite side of said hopper, and is preferably made of rubber so that a good tight seal may be effected between the lands of the feed roll and the opposite side of the hopper. Fine material is discouraged from slipping out the opposite side of the hopper due to the rotation of feed roll 3 which tends to urge material away from that side.

A vertically displaceable gate may also be provided at opening 6 to regulate the free flow of the particulate material in hopper 2 out the end of the apparatus, to minimize continual substantial loss of both fine and coarse material.

And, while we prefer the groove in the feed roll to be rectangular in cross-section, it could obviously be semi-circular, V-shaped, etc., and would still achieve the basic function of denying passage to any particle generally greater than the opening formed by the three sides of a rectangular groove and the straight edge of member 5 in snug relationship to said roll.

It is recognized that an occasional elongated particle having one of its dimensions greater than either the width or depth of the groove may be engaged by the groove, but due to the circular cross section of roll 3, it is highly unlikely that such particle would get past retaining edge 5 before it traveled to the end, and out, of the hopper.

The groove 10 may be varied as to the number of convolutions per unit length of feed roll 3, depending upon the speed with which the roll is to be rotated, the quantity of material required to be fed through the apparatus per unit time, etc. Obviously, too, the rotation of the feed roll may be varied within wide limits in order to vary the rate of feed of material from the apparatus.

Direction of feed isn't critical, as under most circumstances the material may be worked from either direction to the other, the only critical consideration in this respect being that the opening 6, or such other means as may be provided for passing the coarse material from the apparatus, would normally be placed at or near the end of the apparatus hopper toward which the direction of feed moves. As used herein, of course, the term "direction of feed" is that direction, toward either extremity of the feed roll, in which, due to the particular direction of rotation of the feed roll and the direction of the helical groove cut therein, the material will be urged by the helical groove or grooves. And, while we have depicted only one helical groove throughout the length of the feed roll in our illustrated embodiment, it is contemplated that one, two or three grooves could be cut spaced equidistant from each other and having the same characteristics.

As stated above, similar types of apparatus have appeared in the past, but we consider that there are two distinct points of difference between our apparatus and those known heretofore which render ours unique for this particular purpose.

First, so far as the apparatus alone is concerned, we consider it critical that the lands of our feed roll must be wider at the surface of the roll, than the grooves. A review of the prior art will readily illustrate that without exception, prior augers are literally cylinders which have had extremely deep and wide grooves cut in their surface, down to the very axis, the lands of which are really nothing more than a spiral fin or flight, the width of which is a small fraction of the width of the groove itself.

Furthermore, in none of the prior art is there to be found either an auger of the type utilized heretobefore, or one of the type utilized in our invention, in *combination* with particulate material at least *some* of which has a maximum diameter *greater* than the surface width of the helical groove.

Thus, we consider that our apparatus must either (*a*) consist of the combination of an auger-type feeder situated as shown in our apparatus wherein it operates to pass into a predetermined area material having a maximum diameter less than the width of the helical groove, via said groove, and reject coarser material into another area, said coarser material having a maximum dimeter *greater* than the width of said grooves or (*b*) an apparatus as disclosed generally in FIG. 1 wherein the lands of the feed roll have a greater width than the surface width of said grooves.

Having thus described our invention we claim:

1. Apparatus for distributing and screening mixed coarse and fine particulate material comprising:
   (a) a single means to simultaneously distribute and screen said material, said means being a cylindrical roll member journalled to rotate about a central axis, said axis being disposed generally horizontally, and said roll member having a convolute helical groove forming convolutions in its surface extending generally the working length of said roll member, the surface width of said groove being less than the width of a land of said roll between any two adjacent convolutions of said groove;
   (b) a hopper positioned above said member and disposed to communicate therewith by virtue of an elongated slot in the bottom thereof, said roll member being disposed partially within said slot and substantially filling same, two edges of said slot abutting the surface of said roll member in substantially snug relationship along a line, respectively generally parallel to the axis of rotation of said roll;
   (c) means for rotating said roll in a feed direction toward one end thereof;
   (d) means associated with the end of said hopper corresponding with said end of said roller for passing coarse material from said hopper not engaged in said groove;
whereby said single means will disperse discrete particles having maximum diameter less than the surface width of said groove, below said hopper into one predetermined area, and simultaneously screen said particles by passing particles having a maximum diameter greater than the width of said groove from said apparatus into a different predetermined area.

2. Apparatus for distributing and screening mixed coarse and fine particulate plastic material comprising:
   (a) a single means to simultaneously distribute and screen said material, said means being a cylindrical roll member journalled to rotate about a central axis, said axis being disposed generally horizontally, and said roll member having a convolute helical groove forming convolutions in its surface extending generally the working length of said roll member, the surface width of said groove being less than the width of a land of said roll between any two adjacent convolutions of said groove;
   (b) a hopper positioned above said member and disposed to communicate therewith by virtue of an elongated slot in the bottom thereof, said roll member being disposed partially within said slot and substantially filling same, two edges of said slot abutting the surface of said roll member in substantially snug relationship along a line, respectively generally parallel to the axis of rotation of said roll;

(c) means for rotating said roll in a feed direction toward one end thereof;

(d) means forming an aperture between said roll member and said hopper at one end thereof, said aperture having a minimum diameter greater than the maximum diameter of any coarse particle to be placed in said hopper;

whereby said single means will disperse discrete particles, having a maximum diameter less than the surface width of said groove, below said hopper into one predetermined area, and simultaneously screen said particle by passing particles having a maximum diameter greater than the width of said groove from said apparatus into a different predetermined area.

3. The apparatus of claim 2 wherein said groove has a substantially rectangular cross-sectional configuration.

4. The apparatus of claim 2 wherein said groove has a substantially "v" shaped cross-sectional configuration.

5. The apparatus of claim 2 wherein said groove has a substantially "u" shaped cross-sectional configuration.

6. Apparatus for distributing and screening mixed coarse and fine particulate plastic material comprising;
  (a) a single means to simultaneously distribute and screen said material, said means being a cylindrical roll member journalled to rotate about a central axis, said axis being disposed generally horizontally and said roll member having a convolute helical groove forming convolutions in its surface extending generally the working length of said roll member, the surface width of said groove being less than the width of a land of said roll between any two adjacent convolutions of said groove;
  (b) a hopper positioned above said member and disposed to communicate therewith by virtue of an elongated slot in the bottom thereof, said roll member being disposed partially within said slot and substantially filling same, two edges of said slot abutting the surface of said roll member in substantially snug relationship along a line, respectively, generally parallel to the axis of rotation of said roll;
  (c) said hopper containing a charge of discrete particles of a plastic material at least some of which have an individual maximum diameter less than the width of said groove, at least some of which have an individual maximum diameter greater than the width of said groove;
  (d) means for rotating said roll in a feed direction toward one end thereof;
  (e) means forming an aperture between said roll member and said hopper at one end thereof, said aperture having a minimum diameter greater than the maximum diameter of any coarse particle to be placed in said hopper;

whereby said single means will disperse discrete particles, having a maximum diameter less than the surface width of said groove, below said hopper into one predetermined area, and simultaneously screen said particles by passing particles having a maximum diameter greater than the width of said groove from said apparatus into a different predetermined area.

References Cited by the Examiner

UNITED STATES PATENTS

| 50,916 | 11/1865 | Davis | 222—412 |
| 888,827 | 5/1908 | Laverty | 209—283 |
| 1,260,219 | 3/1918 | Long | 222—412 |

FOREIGN PATENTS

| 928,606 | 6/1947 | France. |
| 503,711 | 3/1939 | Great Britain. |

HARRY B. THORNTON, *Primary Examiner.*

R. HALPER, *Assistant Examiner.*